(12) United States Patent
Nishiumi et al.

(10) Patent No.: US 7,102,618 B2
(45) Date of Patent: Sep. 5, 2006

(54) USER CONTROLLED GRAPHICS OBJECT MOVEMENT BASED ON A AMOUNT OF JOYSTICK ANGULAR ROTATION AND POINT OF VIEW ANGLE

(75) Inventors: Satoshi Nishiumi, Kyoto (JP); Kazuo Koshima, Kyoto (JP); Shigeru Miyamoto, Kyoto (JP); Yasunari Nishida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/106,667

(22) Filed: Apr. 15, 2005

(65) Prior Publication Data

US 2005/0174328 A1   Aug. 11, 2005

Related U.S. Application Data

(63) Continuation of application No. 09/686,761, filed on Oct. 12, 2000, now Pat. No. 6,917,356, which is a continuation of application No. 08/836,731, filed on May 22, 1997, now Pat. No. 6,239,806.

(30) Foreign Application Priority Data

Oct. 9, 1995 (JP) .................................... 7-288006
Sep. 20, 1996 (WO) ....................... PCT/JP96/02726

(51) Int. Cl.
*G09G 5/08* (2006.01)
(52) U.S. Cl. .................... 345/161; 345/419; 463/32
(58) Field of Classification Search ............. 345/157, 345/161, 419, 427; 463/32–36
See application file for complete search history.

(56) References Cited

U.S. PATENT DOCUMENTS 3,666,900 A   5/1972   Rothweiler et al.
3,729,129 A   4/1973   Fletcher et al.
3,827,313 A   8/1974   Kiessling
4,148,014 A   4/1979   Burson (Continued)

FOREIGN PATENT DOCUMENTS

AU         90881/91        5/1992

(Continued)

OTHER PUBLICATIONS

*3D Ballz Instruction Booklet*, Accolade, San Jose, California, #3050-00231 Rev. A.

(Continued)

*Primary Examiner*—Regina Liang
(74) *Attorney, Agent, or Firm*—Nixon & Vanderhye P.C.

(57) ABSTRACT

Three-dimensional image display game system and method for use with a display for displaying an object in a three-dimensional space, including an operation controlling device including an operating member having a base end rotatably supported and a free end operable by an operator. The operation controlling device includes an inclination amount data output detector which detects an inclination amount of the operating member to output inclination amount data. The system further includes direction determining circuitry operable to determine a direction that corresponds to an inclination direction of the operating member based on the inclination amount data, and moving object direction determining circuitry which determines a moving direction of the object in three-dimensional space based upon the direction determined by the direction determining circuitry and a point of view angle at which the object is being viewed by the operator in three-dimensional space. A direction in which the operating member must be moved to cause forward movement of the object is offset from a forward direction of the operation controlling device by an angle corresponding to the point of view angle.

9 Claims, 13 Drawing Sheets

U.S. PATENT DOCUMENTS

| | | |
|---|---|---|
| 4,161,726 A | 7/1979 | Burson et al. |
| 4,315,113 A | 2/1982 | Fisher et al. |
| 4,359,222 A | 11/1982 | Smith, III et al. |
| 4,467,412 A | 8/1984 | Hoff |
| 4,469,330 A | 9/1984 | Asher |
| 4,485,457 A | 11/1984 | Balaska et al. |
| 4,538,035 A | 8/1985 | Pool |
| 4,552,360 A | 11/1985 | Bromley et al. |
| 4,575,591 A | 3/1986 | Lugaresi |
| 4,587,510 A | 5/1986 | Kim |
| 4,620,176 A | 10/1986 | Hayes |
| 4,639,225 A | 1/1987 | Washizuka |
| 4,659,313 A | 4/1987 | Kuster et al. |
| 4,685,678 A | 8/1987 | Frederiksen |
| 4,748,441 A | 5/1988 | Brzezinski |
| 4,766,423 A | 8/1988 | Ono et al. |
| 4,783,812 A | 11/1988 | Kaneoka |
| 4,789,932 A | 12/1988 | Cutler et al. |
| 4,799,677 A | 1/1989 | Frederiksen |
| 4,858,930 A | 8/1989 | Sato |
| 4,868,780 A | 9/1989 | Stern |
| 4,875,164 A | 10/1989 | Monfort |
| 4,887,230 A | 12/1989 | Noguchi et al. |
| 4,887,966 A | 12/1989 | Gellerman |
| 4,890,832 A | 1/1990 | Komaki |
| 4,916,440 A | 4/1990 | Faeser et al. |
| 4,924,216 A | 5/1990 | Leung |
| 4,926,372 A | 5/1990 | Nakagawa |
| 4,933,670 A | 6/1990 | Wislocki |
| 4,949,298 A | 8/1990 | Nakanishi et al. |
| 4,974,192 A | 11/1990 | Face et al. |
| 4,976,429 A | 12/1990 | Nagel |
| 4,976,435 A | 12/1990 | Shatford et al. |
| 4,984,193 A | 1/1991 | Nakagawa |
| 5,001,632 A | 3/1991 | Hall-Tipping |
| 5,012,230 A | 4/1991 | Yasuda |
| D316,879 S | 5/1991 | Shulman et al. |
| 5,014,982 A | 5/1991 | Okada et al. |
| 5,016,876 A | 5/1991 | Loffredo |
| D317,946 S | 7/1991 | Tse |
| 5,046,739 A | 9/1991 | Reichow |
| 5,095,798 A | 3/1992 | Okada et al. |
| 5,146,557 A | 9/1992 | Yamrom et al. |
| 5,160,918 A | 11/1992 | Saposnik et al. |
| 5,203,563 A | 4/1993 | Loper, III |
| 5,207,426 A | 5/1993 | Inoue et al. |
| 5,213,327 A | 5/1993 | Kitaue |
| 5,226,136 A | 7/1993 | Nakagawa |
| 5,237,311 A | 8/1993 | Mailey et al. |
| 5,245,320 A | 9/1993 | Bouton |
| 5,259,626 A | 11/1993 | Ho |
| 5,273,294 A | 12/1993 | Amanai |
| 5,276,831 A | 1/1994 | Nakanishi et al. |
| 5,286,024 A | 2/1994 | Winblad |
| 5,290,034 A | 3/1994 | Hineman |
| 5,291,189 A | 3/1994 | Otake et al. |
| 5,317,714 A | 5/1994 | Nakagawa et al. |
| 5,327,158 A | 7/1994 | Takahashi et al. |
| 5,329,276 A | 7/1994 | Hirabayashi |
| 5,337,069 A | 8/1994 | Otake et al. |
| 5,357,604 A | 10/1994 | San et al. |
| 5,358,259 A | 10/1994 | Best |
| 5,371,512 A | 12/1994 | Otake et al. |
| 5,388,841 A | 2/1995 | San et al. |
| 5,388,990 A | 2/1995 | Beckman |
| 5,390,937 A | 2/1995 | Sakaguchi et al. |
| 5,393,070 A | 2/1995 | Best |
| 5,393,071 A | 2/1995 | Best |
| 5,393,072 A | 2/1995 | Best |
| 5,393,073 A | 2/1995 | Best |
| 5,394,168 A | 2/1995 | Smith, III et al. |
| D357,712 S | 4/1995 | Wu |
| 5,415,549 A | 5/1995 | Logg |
| 5,421,590 A | 6/1995 | Robbins |
| 5,426,763 A | 6/1995 | Okada |
| 5,436,640 A | 7/1995 | Reeves |
| 5,437,464 A | 8/1995 | Terasima et al. |
| 5,451,053 A | 9/1995 | Garrido |
| 5,453,763 A | 9/1995 | Nakagawa et al. |
| D363,092 S | 10/1995 | Hung |
| 5,459,487 A | 10/1995 | Bouton |
| 5,473,325 A | 12/1995 | McAlindon |
| 5,512,920 A | 4/1996 | Gibson |
| 5,513,307 A | 4/1996 | Naka et al. |
| 5,515,044 A | 5/1996 | Glatt |
| 5,551,693 A | 9/1996 | Goto et al. |
| 5,551,701 A | 9/1996 | Bouton et al. |
| 5,558,329 A | 9/1996 | Liu |
| 5,563,629 A | 10/1996 | Caprara |
| 5,566,280 A | 10/1996 | Fukui et al. |
| D375,326 S | 11/1996 | Yokoi et al. |
| 5,577,735 A | 11/1996 | Reed et al. |
| 5,589,854 A | 12/1996 | Tsai |
| 5,593,350 A | 1/1997 | Bouton et al. |
| 5,599,232 A | 2/1997 | Darling |
| 5,607,157 A | 3/1997 | Nagashima |
| 5,615,083 A | 3/1997 | Burnett |
| 5,624,117 A | 4/1997 | Ohkubo et al. |
| 5,628,686 A | 5/1997 | Svancarek et al. |
| 5,632,680 A | 5/1997 | Chung |
| 4,870,389 A | 6/1997 | Ishiwata et al. |
| 5,640,177 A | 6/1997 | Hsu |
| 5,643,087 A | 7/1997 | Marcus et al. |
| 5,649,862 A | 7/1997 | Sakaguchi et al. |
| 5,653,637 A | 8/1997 | Tai |
| 5,663,747 A | 9/1997 | Shulman |
| 5,670,955 A | 9/1997 | Thorne, III et al. |
| 5,680,534 A | 10/1997 | Yamato et al. |
| 5,684,512 A | 11/1997 | Schoch et al. |
| 5,691,898 A | 11/1997 | Rosenberg et al. |
| 5,694,153 A | 12/1997 | Aoyagi et al. |
| 5,704,837 A | 1/1998 | Iwasaki et al. |
| 5,706,029 A | 1/1998 | Tai |
| 5,714,981 A | 2/1998 | Scott-Jackson et al. |
| 5,724,497 A | 3/1998 | San et al. |
| 5,731,806 A | 3/1998 | Harrow et al. |
| 5,734,373 A | 3/1998 | Rosenberg et al. |
| 5,734,376 A | 3/1998 | Hsien |
| 5,734,807 A | 3/1998 | Sumi |
| 5,755,620 A | 5/1998 | Yamamoto et al. |
| 5,759,100 A | 6/1998 | Nakanishi |
| 5,769,718 A | 6/1998 | Rieder |
| 5,769,719 A | 6/1998 | Hsu |
| 5,784,051 A | 7/1998 | Harrow et al. |
| 5,785,597 A | 7/1998 | Shinohara |
| 5,786,807 A | 7/1998 | Couch et al. |
| 5,791,994 A | 8/1998 | Hirano et al. |
| 5,793,356 A | 8/1998 | Svancarek et al. |
| 5,804,781 A | 9/1998 | Okabe |
| 5,805,138 A | 9/1998 | Brawne et al. |
| 5,808,591 A | 9/1998 | Mantani |
| 5,816,921 A | 10/1998 | Hosokawa |
| 5,820,462 A | 10/1998 | Yokoi et al. |
| 5,830,066 A | 11/1998 | Goden et al. |
| 5,838,330 A | 11/1998 | Ajima |
| 5,850,230 A | 12/1998 | San et al. |
| 5,862,229 A | 1/1999 | Shimizu |
| 5,867,051 A | 2/1999 | Liu |
| 5,872,999 A | 2/1999 | Koizumi et al. |
| 5,877,749 A | 3/1999 | Shiga et al. |
| 5,880,709 A | 3/1999 | Itai et al. |
| 5,883,628 A | 3/1999 | Mullaly et al. |
| 5,896,125 A | 4/1999 | Niedzwiecki |
| 5,898,424 A | 4/1999 | Flannery |

| | | | |
|---|---|---|---|
| 5,946,004 A | 8/1999 | Kitamura et al. | |
| 5,963,196 A | 10/1999 | Nishiumi et al. | |
| 5,973,704 A | 10/1999 | Nishiumi et al. | |
| 5,984,785 A | 11/1999 | Takeda et al. | |
| 6,001,015 A | 12/1999 | Nishiumi et al. | |
| 6,002,351 A | 12/1999 | Takeda et al. | |
| 6,007,428 A | 12/1999 | Nishiumi et al. | |
| 6,020,876 A | 2/2000 | Rosenberg et al. | |
| 6,022,274 A | 2/2000 | Takeda et al. | |
| 6,034,669 A | 3/2000 | Chiang et al. | |
| 6,036,495 A | 3/2000 | Marcus et al. | |
| 6,042,478 A | 3/2000 | Ng | |
| 6,050,718 A | 4/2000 | Schena et al. | |
| 6,050,896 A | 4/2000 | Hanado et al. | |
| 6,067,077 A | 5/2000 | Martin et al. | |
| 6,071,194 A | 6/2000 | Sanderson et al. | |
| 6,078,329 A | 6/2000 | Umeki et al. | |
| 6,102,803 A | 8/2000 | Takeda et al. | |
| 6,126,544 A | 10/2000 | Kojima | |
| 6,126,545 A | 10/2000 | Takahashi et al. | |
| 6,146,277 A | 11/2000 | Ikeda | |
| 6,149,519 A | 11/2000 | Osaki et al. | |
| 6,154,197 A | 11/2000 | Watari et al. | |
| 6,169,540 B1 | 1/2001 | Rosenberg et al. | |
| 6,175,366 B1 | 1/2001 | Watanabe et al. | |
| 6,186,896 B1 | 2/2001 | Takeda et al. | |
| 6,196,919 B1 | 3/2001 | Okubo | |
| 6,200,253 B1 | 3/2001 | Nishiumi et al. | |
| 6,219,033 B1 | 4/2001 | Rosenberg et al. | |
| 6,239,806 B1 * | 5/2001 | Nishiumi et al. | 345/427 |
| 6,917,356 B1 * | 7/2005 | Nishiumi et al. | 345/161 |

FOREIGN PATENT DOCUMENTS

| | | |
|---|---|---|
| DE | 32 04 428 | 8/1983 |
| DE | 40 18 052 | 12/1990 |
| EP | 268 419 | 5/1988 |
| EP | 431 723 | 6/1991 |
| EP | 0 470 615 | 2/1992 |
| EP | 553 532 | 8/1993 |
| EP | 685 246 | 12/1995 |
| EP | 0771015 A1 | 5/1997 |
| GB | 2234575 | 2/1991 |
| GB | 2 244 546 | 12/1991 |
| GB | 2 263 802 | 8/1993 |
| GB | 2 283 302 | 5/1995 |
| JP | 50-22475 | 3/1975 |
| JP | 57-2084 | 1/1982 |
| JP | 57-18236 | 1/1982 |
| JP | 57-136217 | 8/1982 |
| JP | 59-40258 | 3/1984 |
| JP | 59-121500 | 7/1984 |
| JP | 61-16641 | 1/1986 |
| JP | 61-198286 | 9/1986 |
| JP | 61-185138 | 11/1986 |
| JP | 63-206827 | 8/1988 |
| JP | 2-41342 | 3/1990 |
| JP | 2-68404 | 5/1990 |
| JP | 2-283390 | 11/1990 |
| JP | 3-16620 | 1/1991 |
| JP | 3-248215 | 11/1991 |
| JP | 4-26432 | 1/1992 |
| JP | 4-20134 | 2/1992 |
| JP | 4-42029 | 2/1992 |
| JP | 4-104893 | 9/1992 |
| JP | 4-291468 | 10/1992 |
| JP | 5-100759 | 4/1993 |
| JP | 5-19925 | 5/1993 |
| JP | 5-177057 | 7/1993 |
| JP | 5-241502 | 9/1993 |
| JP | 6-23148 | 2/1994 |
| JP | 6-54962 | 3/1994 |
| JP | 6-68238 | 3/1994 |
| JP | 6-110602 | 4/1994 |
| JP | 6-114683 | 4/1994 |
| JP | 6-190145 | 7/1994 |
| JP | 6-190147 | 7/1994 |
| JP | 6-205010 | 7/1994 |
| JP | 6-61390 | 8/1994 |
| JP | 6-285259 | 10/1994 |
| JP | 6-315095 | 11/1994 |
| JP | 07068052 | 3/1995 |
| JP | 7-104930 | 4/1995 |
| JP | 07088252 | 4/1995 |
| JP | 7-144069 | 6/1995 |
| JP | 7-213740 | 8/1995 |
| JP | 7-222865 | 8/1995 |
| JP | 7-288006 | 10/1995 |
| JP | 7-317230 | 12/1995 |
| JP | 8-45392 | 2/1996 |
| JP | 9-56927 | 3/1997 |
| JP | 62-269221 | 11/1997 |
| WO | WO 92/09347 | 6/1992 |
| WO | WO 94/12999 | 6/1994 |
| WO | WO 94/22544 | 10/1994 |
| WO | WO96/36060 | 11/1996 |
| WO | WO97/17651 | 5/1997 |
| WO | WO97/32641 | 12/1997 |

OTHER PUBLICATIONS

6 Photographs of Sony PlayStation: 1) top case and compact disk; 2) hand controller; 3) internal circuit boards (top view); 4) internal circuit boards (top view); 5) compact disk reader (bottom view); and internal main circuit board (bottom view).

*Knuckles Chaotix Instruction Manual*, Sega, Redwood City, California, #84503 (1995).

*Nintendo Power*, vol. 30, p. 22, PilotWings article.

*Nintendo Power*, vol. 31, p. 35, PilotWings article.

*Nintendo Power*, vol. 31, pp. 74-76, PilotWings article.

*Nintendo Power*, vol. 38, p. 25, PilotWings article.

*Nintendo Power*, vol. 46, PilotWings article.

*PilotWings Instruction Booklet*, Super Nintendo Entertainment System, SNS-PW-USA, copyright 1991.

*PilotWings, It's a Festival of Flight*, Top Secret Password Nintendo Player's Guide, pp. 82-83 and 160, copyright 1991.

*PilotWings, Soar with the Flight Club*, Super Nintendo Entertainment System Play's Guide, pp. 100-105, copyright 1991.

*Sega Genesis 32X Instruction Manual*, Sega, Redwood City California, #672-2116 (1994).

*Sega Genesis Instruction Manual*, Sega, Hayward, California, #3701-926-0-01 (1994).

*Sonic 2 The Hedgehog Instruction Manual*, Sega, Hayward, California, #672-0944 3701-925-0-01 (1992).

Sony PlayStation Instruction Manual, and informational materials, Sony Computer Entertainment Inc. 1995.

"Analog Joystick Interface Emulation Using a Digital Counter", IBM technical Disclosure Bulletin, vol. 37, No. 08, Aug. 1994, pp. 73-74.

"Hardware Reset With Microcode Warning Period", *IBM Technical Disclosure Bulletin*, vol. 33, No. 11, Apr. 1991, pp. 105-106.

Drucker et al., "Cinema: A System for Procedural Camera Movements", *Proceedings of the Symposium on Interactive 3D Graphics*, Cambridge, MA., Mar. 29-Apr. 1, 1992 pp. 67-70.

Super Mario 64 Player's Guide, Nintendo of America, 1996.

Nintendo Power, "The Fun Machine" for Nintendo 64, 1996.

Nintendo Power, vol. 80, pp. 20-27, Jan. 1996.

Sega Force/Saturn Tech Specs, Saturn Chipset, Hardware Specifications, 1997.

Sega Force/Saturn Peripherals, Data Information: Saturn, 1997-1999.

*Nintendo Employee Shosinski Reports*, 14 pages, Nov. 24-26, 1995.

US 6,017,271, 01/2000, Miyamoto et al. (withdrawn)

* cited by examiner

| 1 BYTE | B | A | G | START | ↑ | ↓ | ← | → |
|---|---|---|---|---|---|---|---|---|
| 2 BYTE | JSRST | O | L | R | E | D | C | F |
| 3 BYTE | X ORDINATE ||||||||
| 4 BYTE | Y ORDINATE ||||||||

USER CONTROLLED GRAPHICS OBJECT MOVEMENT BASED ON A AMOUNT OF JOYSTICK ANGULAR ROTATION AND POINT OF VIEW ANGLE

CROSS-REFERENCES TO RELATED APPLICATIONS

This is a continuation of application Ser. No. 09/686,761, filed Oct. 12, 2000, now U.S. Pat. No. 6,917,356, which is a continuation of application Ser. No. 08/836,731, filed May 22, 1997, now U.S. Pat. No. 6,239,806, the entire contents of which are hereby incorporated by reference in this application.

FIELD OF THE INVENTION

This invention relates to three-dimensional image processing systems. More particularly, this invention is concerned with a three-dimensional image processing system for video game machines or the like, which is adapted to display an object in a realistic manner in a three-dimensional space on a display such that the object is moved in accordance with the direction and amount of inclination of an operating member, such as an analog joystick, of an operating device, e.g., a video game controller.

BACKGROUND OF THE INVENTION

The conventional video game machine has a cross-shaped key which is provided on a controller so that the object displayed on the display is moved by a player's operation of the cross key. Such a cross key is a so-called digital joystick, by which only the direction of movement is designated for the object. With such a cross key, the speed of movement is impossible to designate.

There also is a prior art method where moving speed of the object is varied depending upon the length of the time period over which a cross key is depressed. In such a method, acceleration or deceleration is determined for the object at a constant acceleration rate or a constant deceleration rate by each constant depression time period. Although, in this method, the moving direction and the moving speed of the object can be controlled even by using a digital joystick, there are disadvantages using this approach. That is, the moving speed for the object is merely varied at a constant rate of acceleration or deceleration as determined by software calculations, so that is impossible to arbitrarily control the speed of movement. Furthermore, the speed is determined by the period of key depression time, which requires that the cross key has to be kept depressed for a certain period or longer, resulting in poor responsiveness.

Under such circumstances, the present applicant has proposed by Japanese Provisional Utility Model Publication No. H2-41342, laid open to public on Mar. 22, 1990, a controller which has three contacts arranged in one direction on a cross key thereof so that the moving speed, besides the moving direction, is varied for the object by utilization of changing turning-on of contacts depending upon depression amount of the cross key.

In this prior art, however, the direction of movement is limited to four directions of upper, lower, left and right (and intermediate directions thereof), and the speed of movement is varied only between three stages of speed. That is, in this prior art there still exists limitations on the moving direction and the moving speed.

Although there are already known game machines employing an analog joystick for a control lever of an aircraft, such an analog joystick of the game machines are typically utilized for controlling, for example, the inclination of the aircraft, and wherein control is impossible for the moving direction or the moving speed.

SUMMARY OF THE INVENTION

It is therefore the primary object of the present invention to provide an image processing system which is high in responsiveness and is capable of controlling the moving direction and the moving speed of a player controlled object.

The present invention is directed to a three-dimensional image processing system, including an image processing apparatus connected to a display to generate image data for displaying an object existing in a three-dimensional space on the display according to a stored program, and an operating device including an operating member having a base end rotatably supported and a free end operable by an operator, so that the image data is varied in accordance with movement of the operating member. The operating device includes inclination amount data output circuitry which detects an inclination amount of the operating member to output inclination amount data. The exemplary image processing apparatus includes direction determining hardware and software which determines a moving direction of the object in the three-dimensional space based on the inclination amount data; moving amount determining hardware and software which determines a moving amount of the objection within one display frame; position determining hardware and software which determines object position in the three-dimensional space in accordance with the moving direction and the moving amount; and an image data output circuitry which outputs image data for displaying the object on the display at a position controlled by the position determining hardware and software.

The operating device is, for example, an analog joystick, which includes a base end supported rotatably with a given angle range and a free end for being operated by an operator so that the operating member is inclined to arbitrary directions in accordance with operator operation. For example, an inclination amount data output circuitry such as an X counter and a Y counter detects the amount of inclination of the operating member to output inclination amount data.

The image processing apparatus includes a program storing memory, wherein the program storing memory is preferably an external storage device detachably attached to the image processing apparatus main body. Direction determining circuitry and moving amount determining circuitry comprised, for example, of a CPU under control of the stored program respectively determine moving direction of the object in the three-dimensional space and moving amount of the object to be moved in one display frame, based on the inclination amount data from the operating device.

Specifically, count values of an X counter and the Y counter are converted by normalizing into a UV coordinate frame. The CPU determines the inclination amount (L) and the inclination direction ($\tan^{-1}$) by the UV coordinate value (u, v). The direction determining circuitry is, for example, the CPU, which determines under program control the moving direction of the object based on the inclination direction ($\tan^{-1}$) thereof and the point of view (camera angle) at which the object is considered to be "photographed" in the three-dimensional space. The moving amount determining circuitry is, for example, the CPU, which determines under the program control the moving amount of the object within one display frame, i.e., the moving speed, based on the inclination amount (L) and the maximum speed (max-speed).

Therefore the position determining circuitry determines the position of the object in three-dimensional space in dependence upon the moving direction and the moving amount. Consequently, the image data output circuitry outputs image data for display of the object at the position thus determined.

In accordance with the present invention, the operation of one operating device such as an analog joystick provides control of the moving direction and the moving amount (moving speed) of the object.

The above and other objects, features, aspects, and advantage of the present invention will become more apparent from the ensuing detailed description of the present invention when taken in conjunction with the accompanying drawings.

EMBODIMENTS

Figure 1:
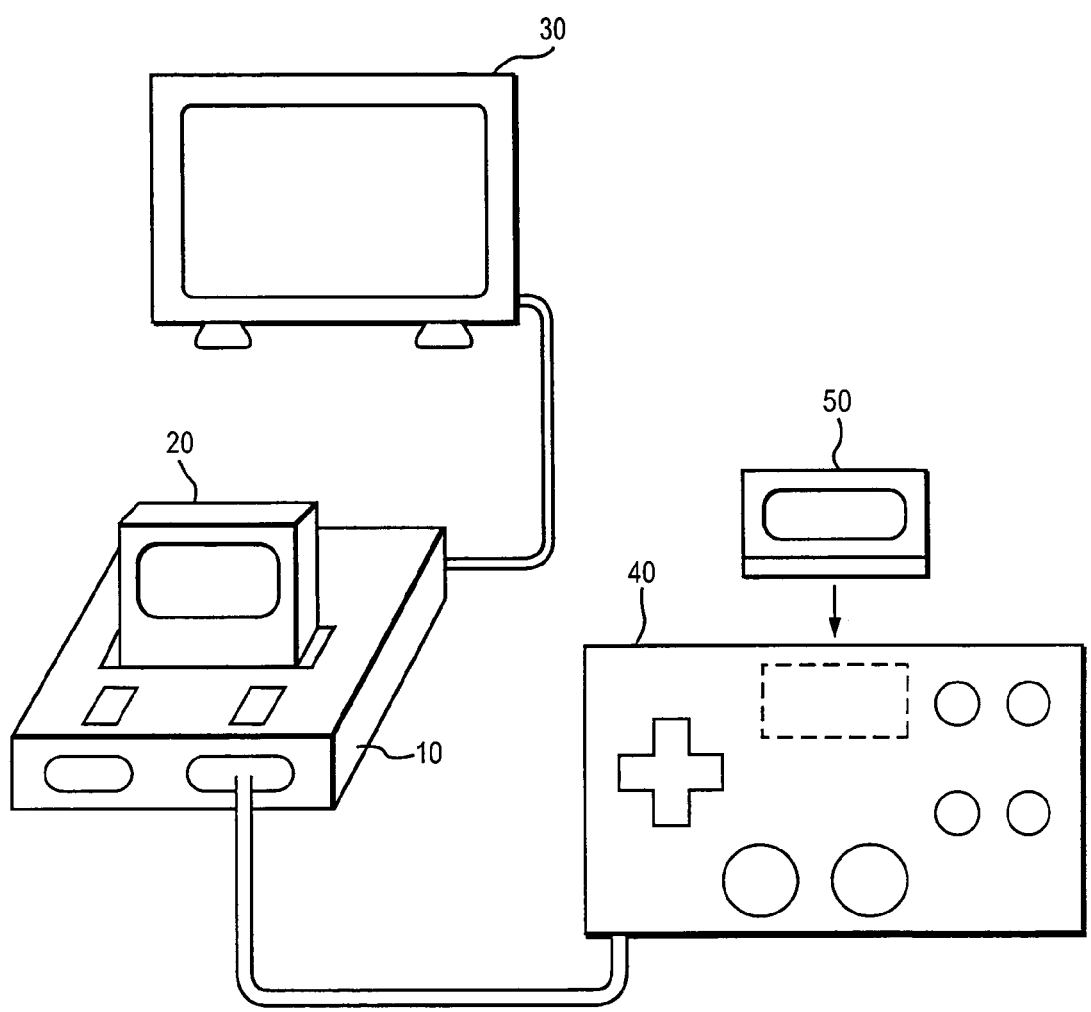
FIG. 1 is a schematic illustrative view showing one embodiment of the present invention.

Referring to FIG. 1, there is illustrated an external view showing an exemplary three-dimensional image processing system according to one embodiment of the present invention. The image processing system is, for example, a video game system, which includes an image processing apparatus main body 10, a ROM cartridge 20 (as one example of an external memory device), a television type monitor 30 (as one example of a display means) connected to the image processing apparatus main console 10, a schematically represented illustrative controller 40, and a RAM cartridge 50 (as one example of an extension device detachably attached to the controller 40). The external memory device stores image data and program data for image processing for games, an audio data for music, sound effects, etc. A CD-ROM or a magnetic disc may alternatively be employed in place of the ROM cartridge. Where the image processing system of this exemplary embodiment is applied to a personal computer, an input device such as a keyboard or a mouse may be used as the operating mechanism.

Figure 2:
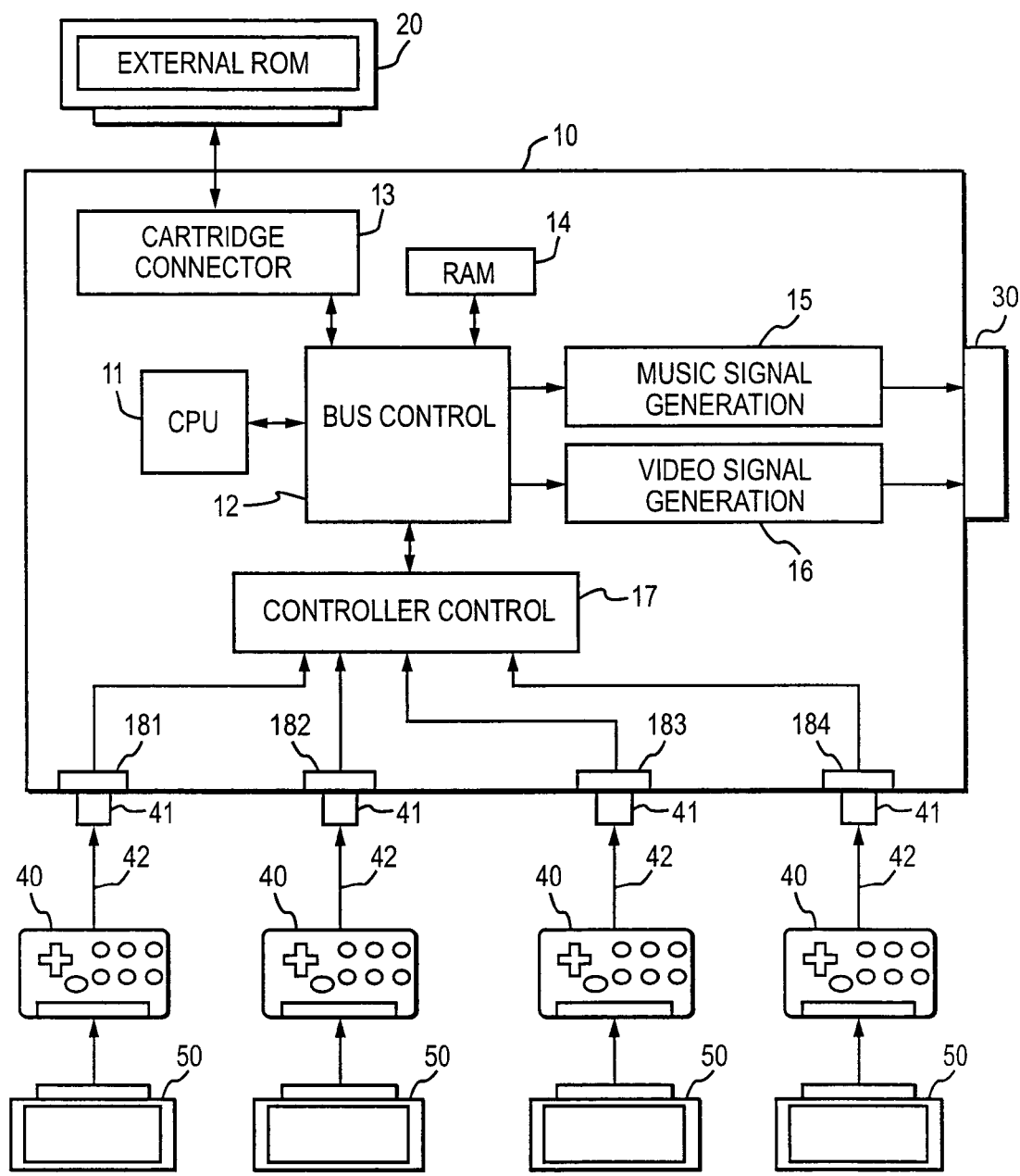
FIG. 2 is a block diagram showing an illustrative image processing apparatus in the FIG. 1 embodiment.

FIG. 2 is a block diagram of an exemplary image processing system. The image processing apparatus 10 incorporates therein a central processor unit (hereinafter "CPU") 11 and a bus control circuit 12. The bus control circuit 12 is connected to a cartridge connector 13 for detachably attaching a ROM cartridge 20, and a RAM 14. The bus control circuit 12 is connected to an audio signal generating circuit 15 for outputting an audio signal processed by the CPU 11 and a video signal generating circuit 16 for outputting a video signal, and further to a controller control circuit 17 for serially transferring operating data from one or a plurality of controller(s) 40 and/or data from RAM cartridge(s) 50. The controller control circuit 17 is connected to controller connectors (hereinafter abbreviated as "connectors") 181–184 which are provided at a front console face of the image processing apparatus 10. A connection jack 41 is detachably connected to connector 181–184 and to the controllers 40 through a cable 42. Thus, the connection of the controller 40 to the connector 181–184 places the controller 40 into electric connection with the image processing apparatus 10, enabling transmission and reception of data therebetween.

More specifically, the bus control circuit 12 receives a command output as a parallel signal from the CPU 11 via a bus and converts it to a serial signal for outputting a serial signal command to the controller control circuit 17, and converts serial signal data input from the controller control circuit 17 into a parallel signal for output to a bus. The data output through the bus is processed by the CPU 11, and may be stored in RAM 14. RAM 14 is a memory for temporarily storing the data to be processed by the CPU 11, wherein read-out and writing of data is possible through the bus control circuit 12.

The bus control circuit 12, included in the image processing apparatus 10 in FIG. 2, for example, includes a coprocessor RCP (Reality Co-Processor) which may be a RISC processor. As shown in the FIG. 3 exemplary embodiment, the coprocessor RCP includes an I/O control 121, a signal processor 122 and a display or drawing processor 123. The I/O control 121 controls not only the transfer of data between the CPU 11 and the RAM 14, but also the flow of data between the signal processor 122 or the drawing processor 123 and the RAM 14 or the CPU 11. That is, data from the CPU 11 is delivered to the RAM 14 via the I/O control 121, and further data from the RAM 14 is supplied to the signal processor 122 and the drawing processor 123 for processing therein. The signal processor 122 and the drawing processor 123 respectively process music signal data and image signal data and store such data in RAM 14. The I/O control 121 then reads the music signal data and the image signal data out of the RAM 14 according to instructions executed by the CPU 11 to supply respective signals to a music signal generating circuit (D/A converter) 15 and an image signal generating circuit (D/A converter) 16. The music signal is supplied via a connector 195 to a speaker 31 included in a TV monitor 30. The image signal is supplied via a connector 196 to a display 32 included in the TV monitor 30.

Figure 3:
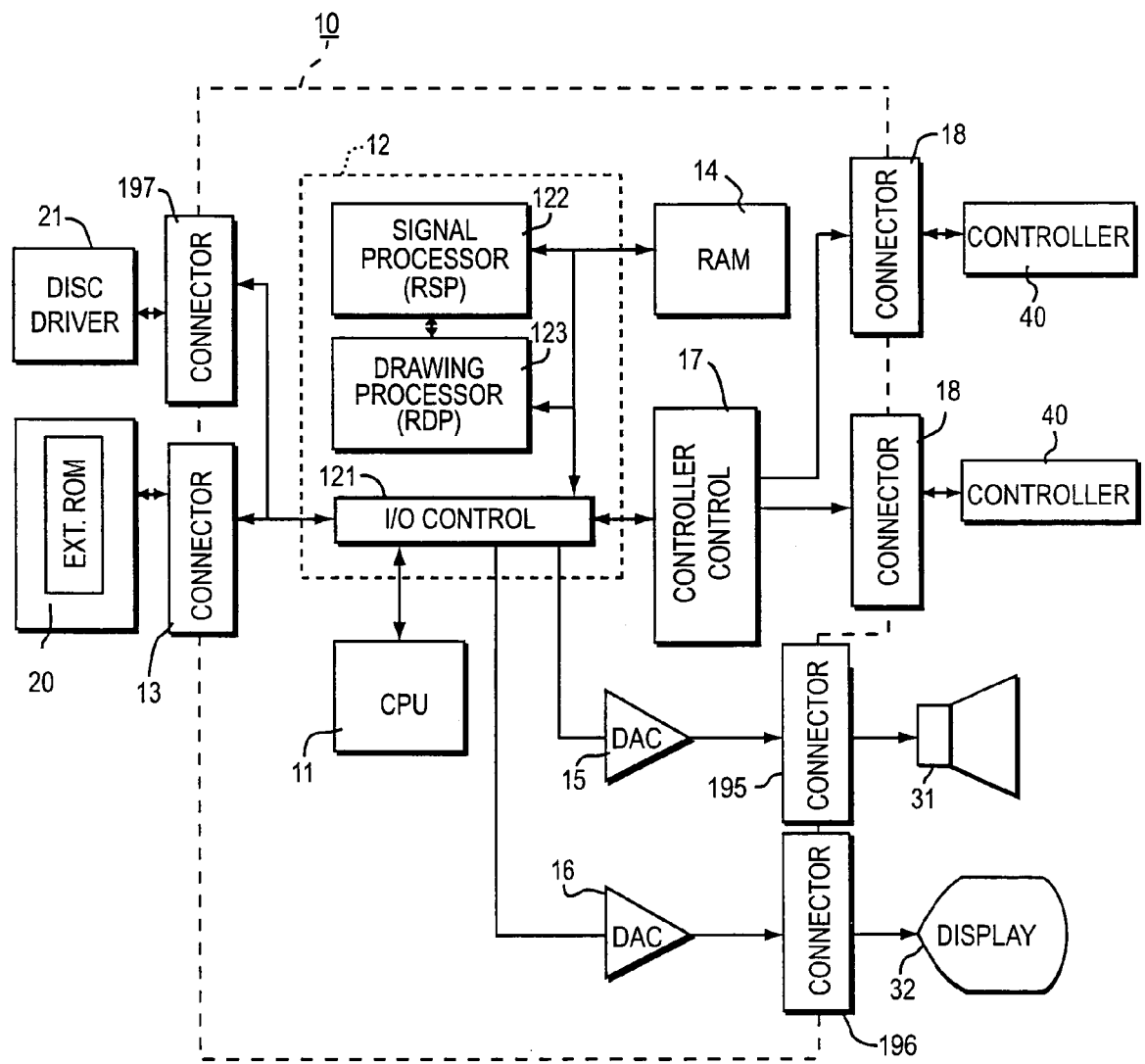
FIG. 3 is a block diagram showing in more detail an illustrative bus control circuit in the FIG. 2 embodiment.

A disc driver 21 may be connected to the image processing apparatus 10 as shown in FIG. 3, in place of or together with the external ROM 20 wherein the disc driver can read out of or write to an optical disc or a magnetic disc. In this case, the disc driver 21 is connected to the RCP 12, i.e., the I/O control 121, through a connector 197.

Figure 4:
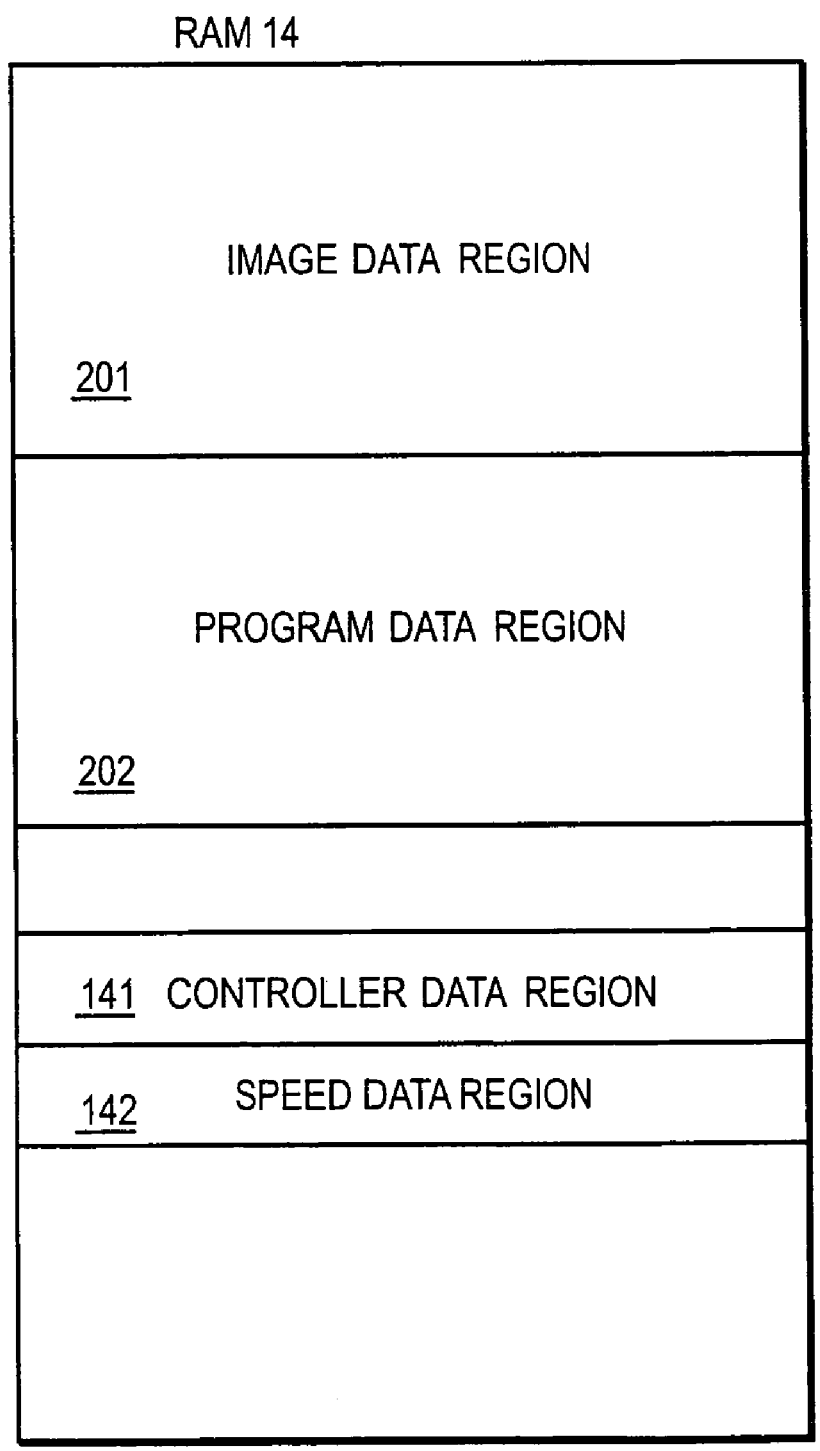
FIG. 4 is an illustrative view showing a memory map of a RAM in the FIG. 2 embodiment.

FIG. 4 is an illustrative diagram showing memory areas assigned to CPU 11 memory address space. The RAM address space is accessible by the CPU via the bus control circuit, i.e., the RCP 12 and includes an image data region 201 for storing image data required to cause the image processing apparatus 10 to generate image signals for the game, and a program data region 202 for storing program data required for controlling predetermined CPU 11 operations. In the program data region 202, there are fixedly stored an image display program for performing image display processing based on image data 201, a time-measuring program for performing processing relating to the measurement of time, and a determination program for determining that the cartridge 20 and an extension device 50, hereinafter referred to, have a predetermined relationship. The RAM 14 includes further a region 141 for temporarily storing data representative of an operating state from a control panel or controller and a speed data region 142 for storing data indicative of the speed of object movement (the amount of movement over which the object moves in one display frame).

Figure 5:
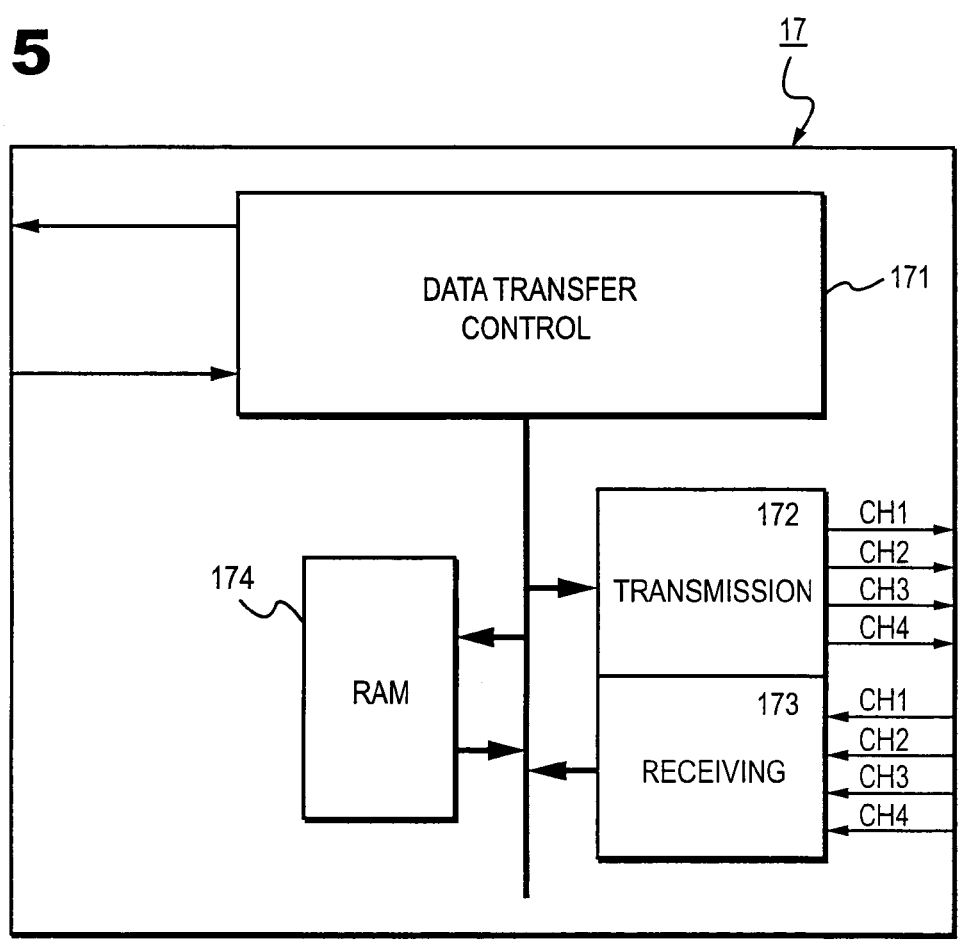
FIG. 5 is a block diagram showing a controller control circuit in the FIG. 2 embodiment.

The controller control circuit 17 is provided for transmission and reception of data in serial between the bus control circuit 12, i.e., the RCP, and the connector 181–184, and includes as shown in FIG. 5 a data transfer control circuit 171, a signal transmitting circuit 172, a signal receiving circuit 173 and a RAM 174 for temporarily storing transmission and reception data. The data transfer control circuit 171 includes a parallel-serial conversion circuit and a serial-parallel conversion circuit for data format conversion during data transfer, and also controls write-in and read-out of the RAM 174. The serial-parallel conversion circuit converts serial data supplied from the bus control circuit 12 into parallel data to provide it to the RAM 174 or the signal transmitting circuit 172. The parallel-serial conversion circuit converts parallel data supplied from the RAM 174 or the signal receiving circuit 173 into serial data to provide to the bus control circuit 12. The signal transmission circuit 172 converts data for signal read-in control of the controller 40 supplied from the data transfer control circuit 171 and converts write-in data (parallel data) to the RAM cartridge 50 into serial data, which data is transmitted through a corresponding channel CH1–CH4 to each of the plurality of controllers 40. The signal receiving circuit 173 receives data in serial form representative of an operating state of each of the controllers 40, input through a corresponding channel CH1–CH4 and read-out data from the RAM cartridge 50, to convert such data into parallel data to provide to the data transfer control circuit 171.

Figure 6:
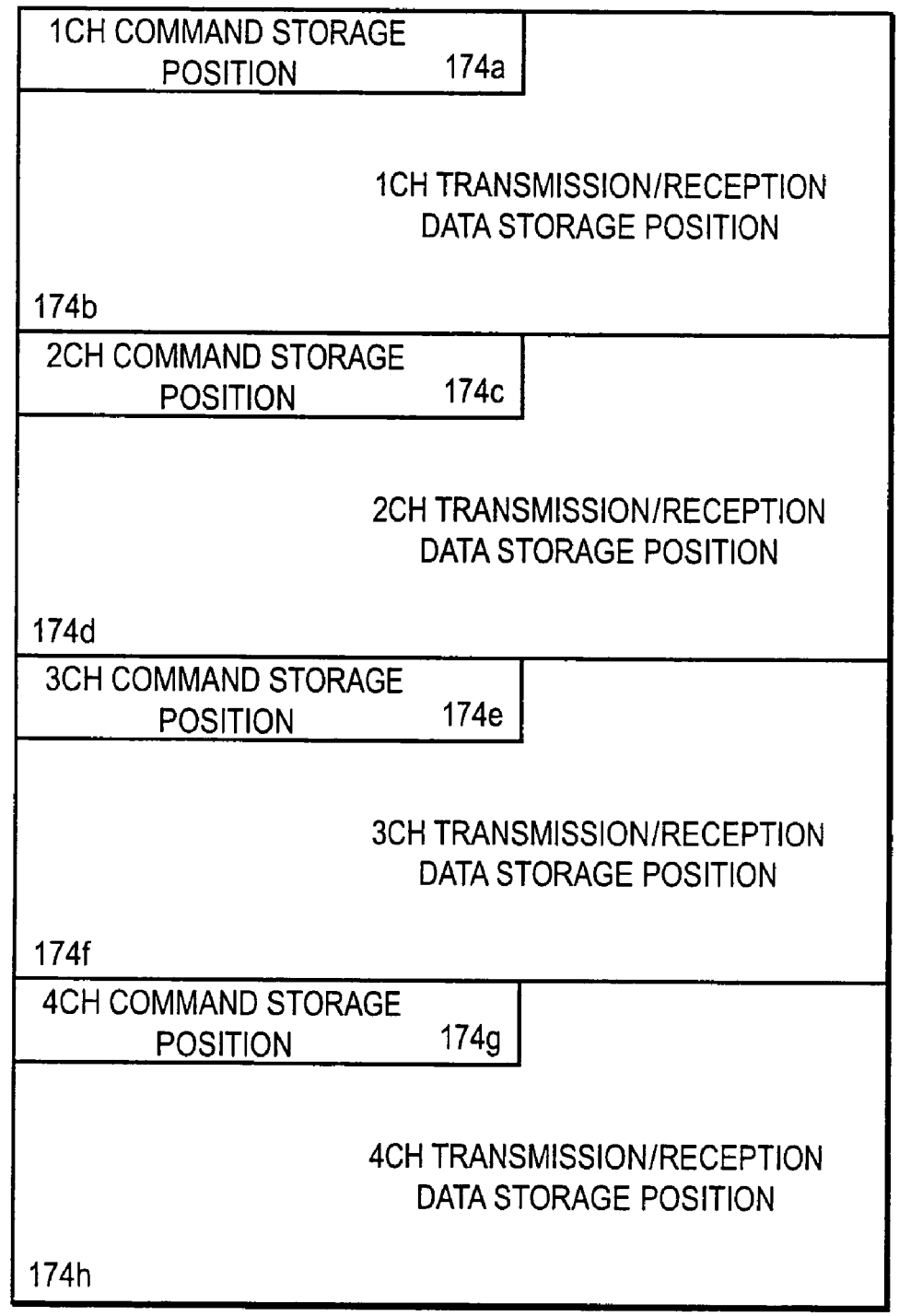
FIG. 6 is an illustrative view showing a memory map of a RAM in FIG. 5.

The RAM 174 of the controller control circuit 17 includes memory regions or memory areas 174*a*–174*h* as shown in a memory map of FIG. 6. Specifically, the area 174*a* stores a command for channel 1, while the area 174*b* stores transmission data and reception data for channel 1. The area 174*c* stores a command for channel 2, while the area 174*d* stores transmission data and reception data for channel 2. The area 174*e* stores a command for channel 3, while the area 174*f* stores transmission data and reception data for channel 3. The area 174*g* stores a command for channel 4, while the area 174*h* stores transmission data and reception data for channel 4.

Accordingly, the data transfer control circuit 171 operates to control writing to the RAM 174 data transferred from the bus control circuit 12 or data indicating the operating state of the controller 40 received by the signal receiving circuit 173. The data transfer control circuit 171 operates to control reading out of data from the RAM cartridge 50, and reading data out of the RAM 174 based on a command from the bus control circuit 12 to transfer such data to the bus control circuit 12.

Figure 7:
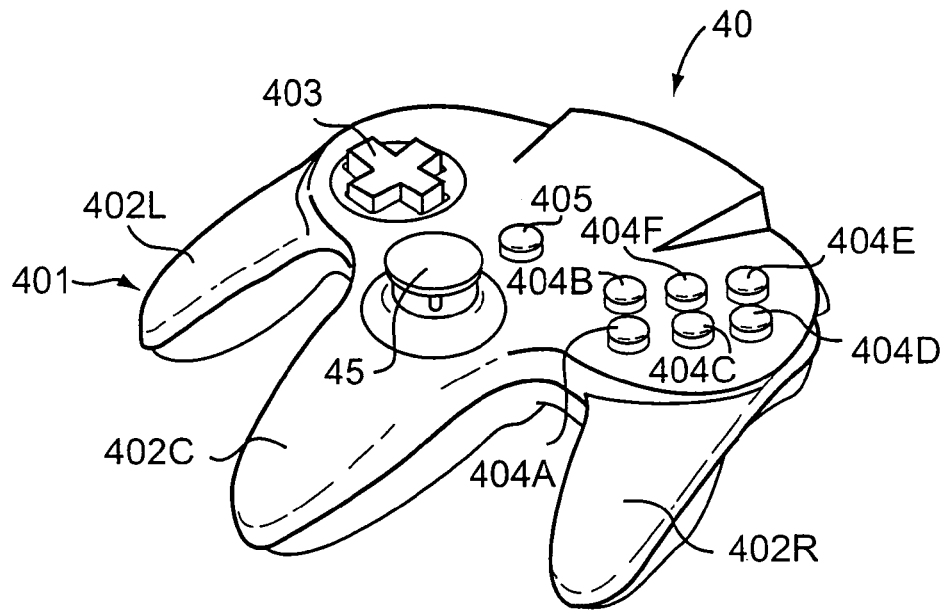
FIG. 7 is a perspective view of a controller in the FIG. 2 embodiment as viewed from the top.
Figure 8:
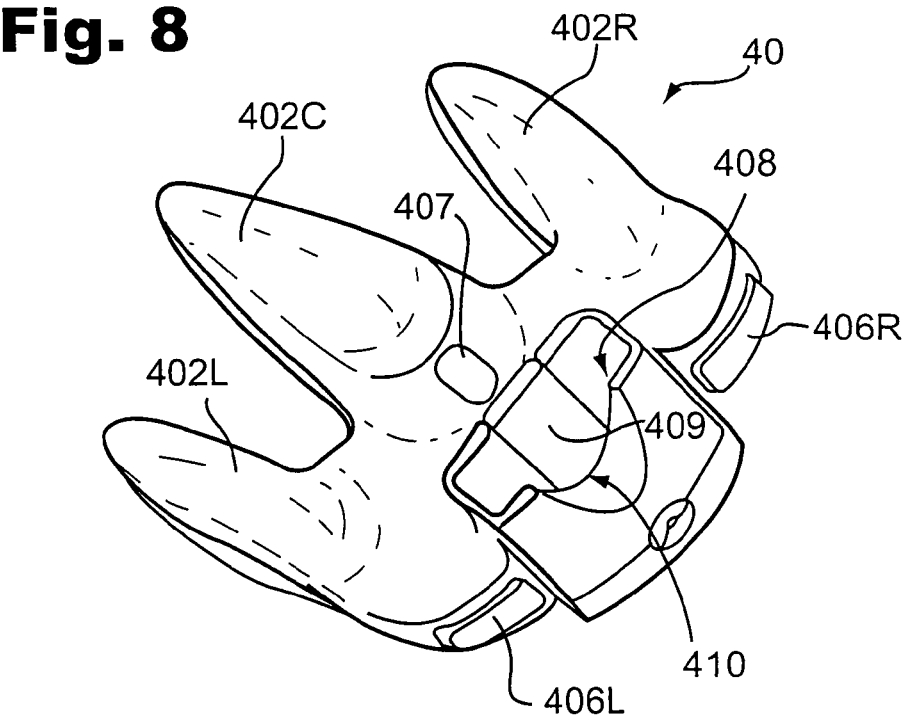
FIG. 8 is a perspective view of the controller in the FIG. 2 embodiment as viewed from the bottom.

FIG. 7 and FIG. 8 are external perspective views of front and back surfaces of a controller 40. The controller 40 is shaped such that it can be grasped by both hands or one hand, and has a housing having an exterior formed with a plurality of projecting buttons or control keys which, when depressed, generate an electric signal and a vertically-standing control member portion. Specifically, the controller 40 includes an upper housing and a lower housing. The housing of the controller 40 has an operating area formed on an upper surface in a planar shape extending sideways. The operating area of the controller 40 includes a cross-shaped digital direction switch (hereinafter referred to as "cross switch") 403 on a left side, a plurality of button switches (hereinafter referred to as "switches") 404A–404F on a right side, a start switch 405 generally at a laterally central portion, and a joystick 45 providing analog input at a centrally lower portion. The cross switch 403 is a direction switch for designating the direction of movement of a player controlled heroic character or a cursor, which has upper, lower, left and right depression points used for designating movement in four directions. The switches 404A–404F, may have different functions as defined by game software and may be used, for example, to launch a missile in a shooting game, or designate various actions such as jumping, kicking, or controlling an action game in many different ways. The joystick 45 may be used in place of the cross switch 403 to designate the direction of movement of an object. It can designate direction over the entire angular range over 360 degrees, being utilized as an analog direction designating switch.

The housing of the controller 40 has three grips 402L, 402C and 402R formed in a manner projecting downward from three locations of the operating area. The grips 402L, 402C and 402R are in such rod-shapes that, when held by the hand, they are contoured by the palm, the middle finger, the finger between the little and the middle finger and the little finger. Each grip is formed by a relatively thin base portion, a thicker intermediate portion which thins toward an open end (downward in FIG. 7). The bottom housing the controller 40 has an insertion aperture 408 formed at a centrally upper portion which projects from the underside for detachably attached, for example, a RAM cartridge 50 as an extension device. The housing has a button switch 406L and a button 406R provided on left and right upper side faces thereof at locations corresponding to the positions to which the left and right index fingers of a player extend. On a back surface at the base portion of the central grip 402C, a switch 407 is provided as a switch having a function similar to the switch 406L when the joystick 45 is used in place of the cross switch 403 (or whose function may be varied in accordance with the game program).

The lower half of the housing on a back surface side extends toward a bottom surface to have the aperture 408 formed at a tip end thereof. At a deep end of the aperture 408, a connector (not shown) is provided to which an extension cartridge 50 is to be connected. In the aperture 408 a lever 409 is also formed for ejecting the cartridge 50 inserted in the aperture 408. On a side opposite to the lever 409 in the aperture 408 for insertion of an extension cartridge 50, a cut-out 410 is formed, which cut-out 410 provides a space for pulling out the extension cartridge 50 upon taking out the extension cartridge 50 by using the lever 409.

Figure 9:
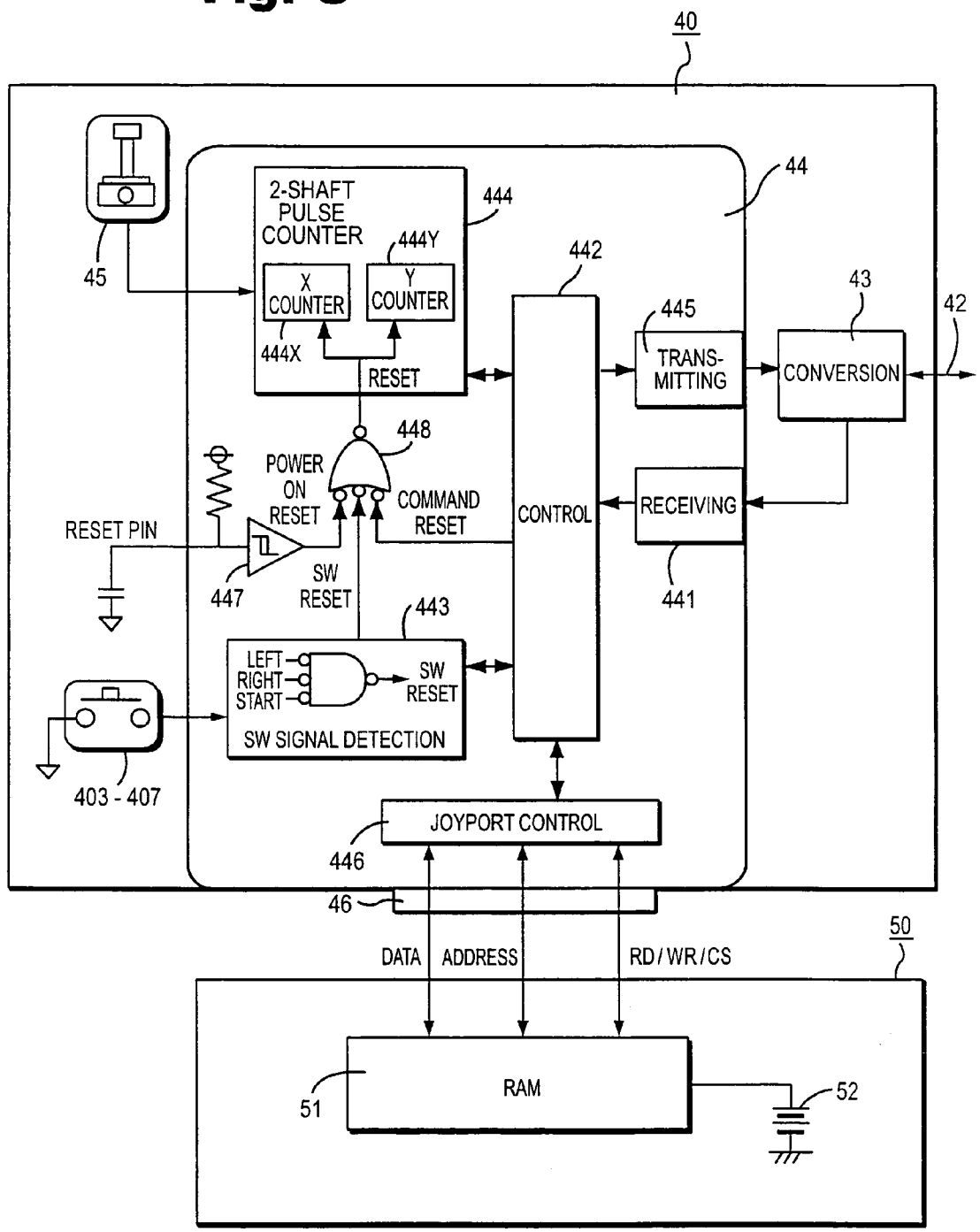
FIG. 9 is a block diagram showing in detail the controller and an extension device.

FIG. 9 is a detailed circuit diagram of a controller 40 and a RAM cartridge 50 shown as one example of an extension or expansion device. The controller 40 incorporates within the housing electronic circuits such as operation signal processing circuit 44, etc. in order to detect operating states of the switches 403–407 or the joystick 45 or the like and transfer detected data to the controller control circuit 17. The operation signal processing circuit 44 includes a signal receiving circuit 441, a control circuit 442, a switch signal detecting circuit 443, a counter circuit 444, a signal transmitting circuit 445, a joyport control circuit 446, a reset circuit 447 and a NOR gate 448.

The signal receiving circuit 441 converts a serial signal, such as a control signal transmitted from the controller control circuit 17, or write-in data to the RAM cartridge 50, etc. into a parallel signal to supply it to the control circuit 442. The control circuit 442 generates a reset signal to cause resetting (0) of measured values of an X-axis counter 444X and a Y-axis counter 444Y included in the counter 444, when the control signal transmitted from the controller control circuit 17 is a reset signal for an X, Y coordinate of the joystick 45. The joystick 45 includes photo-interrupters for the X-axis and the Y-axis to generate a number of pulses proportional to the amount of inclination of a lever in directions of the X-axis and Y-axis, providing respective pulse signals to the counters 444X and 444Y. The counter 444X, when the joystick 45 is inclined in the X-axis direction, measures the number of pulses generated in proportion to the amount of inclination. The counter 444Y measures the number of pulses generated in proportion to the amount of inclination, when the joystick 45 is inclined in the Y-axis direction. Accordingly, the resultant vector, determined by the measured values in X-axis and Y-axis of the counter 444X and the 444Y, determines the moving direction and the moving speed for the displayed player controlled object or the cursor.

The counter 444X and the counter 444Y are also reset of their measured values by a reset signal supplied from the reset signal generating circuit 447 upon turning on the power supply, or a reset signal supplied from the switch signal detecting circuit 443 when the player simultaneously depresses two switches.

The switch signal detecting circuit 443 responds to an output command signal representing a switch state supplied at a constant period (e.g., at a 1/30-second interval in a frame period of a television), and reads a signal that is varied by the state of depression of the cross switch 403 and the switches 404A–404F, 405, 406L, 406R and 407 to supply it to the control circuit 442.

The control circuit 442 responds to a read-out command signal of operating state data from the controller control circuit 17, and supplies the operating state data of the switches 403–407 and the measured values of the counters 444X, 444Y to the signal transmitting circuit 445 in a predetermined data-format order. The signal transmitting circuit 445 converts these parallel signals output from the control circuit 442 into serial data to transfer them to the controller control circuit 17 via a conversion circuit 43 and a signal line 42.

To the control circuit 442 are connected an address bus, a data bus, and a port control circuit 446 through a port connector 40. The port control circuit 446 performs input-output control (or signal transmission or reception control) on data according to commands from the CPU 11, when the RAM cartridge 50, which is one example of an extension device, is connected to a port connector 46. The RAM cartridge 50 includes a RAM 51 which is connected to the address bus and the data bus, and which includes a battery 52 for supplying power source to the RAM 51. The RAM 51 may, for example, be a RAM that has a capacity lower than a half of a maximum memory capacity accessible by using an address bus, and may, for example, be a 256 k-bit RAM. The RAM 51 stores backup data associated with a game, so that, if the RAM cartridge 50 is removed from the port connector 46, the stored data is maintained by receiving power supply from the battery 52.

Figures 10, 11:
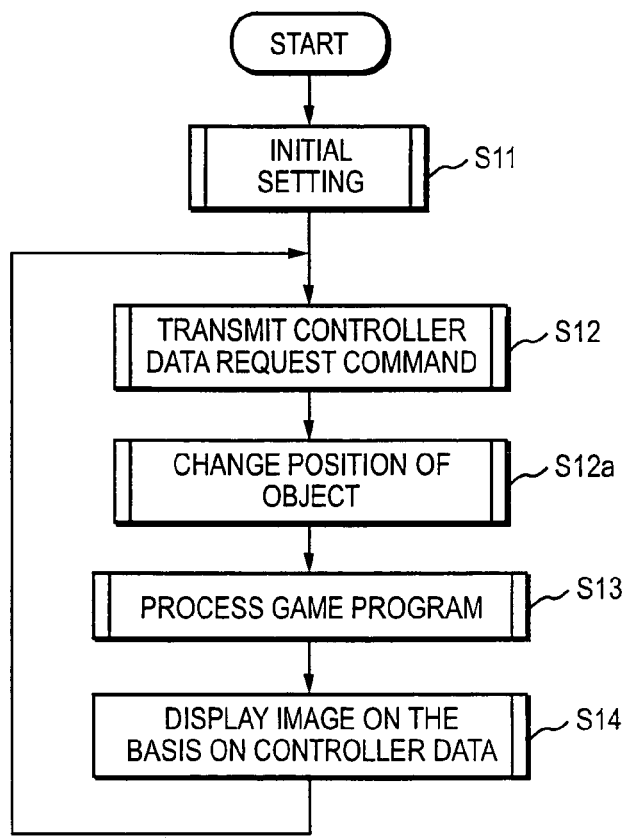
FIG. 10 is an illustrative view showing data of an analog joystick of the controller and respective buttons.
FIG. 11 is a flowchart showing the operation of a CPU in the FIG. 2 embodiment.

FIG. 10 is a graphical illustration of a data format by which the image processing apparatus reads out data representative of an operating state of switches 403–407 and joystick 45 from the controller 40. The data generated by the controller 40 is configured as 4-byte data. The first-byte data B, A, G, START, upper, lower, left and right, i.e., represents the state of switches 404B, 404A, 407, 405 and cross switch 403. For example, when the button B, i.e., the switch 404B, is depressed, the highest order bit of the first byte becomes "1". Similarly, the second-byte represents JSRST, 0 (not employed in the exemplary embodiment), L, R, E, D, C and F, i.e., the state of the switches 409, 406L, 406R, 404E, 404D, 404C and 404F. The third byte represents by binary digit the X coordinate value (measured value by the X counter 444X) which value depends upon the inclination angle of the joystick 45 in the X direction. The fourth byte represents by binary digit the Y coordinate value (measured value by the Y counter 444Y) which value depends upon the inclination angle of the joystick 45 in the Y direction. Because the X and Y coordinate values are expressed by 8 bits of binary digit, the conversion into decimal digit makes it possible to represent the inclination of the joystick 45 by a numeral of from 0–255. If the highest order bit is expressed by a signal denoting a negative value, the inclination angle of the joystick 45 can be expressed by a numeral between −128 and 127.

An explanation of the transmission and reception of data between the image processing apparatus 10 and the controller 40, as well as the operation of object movement control according to the data from the controller 40 is set forth below.

Referring first to a FIG. 11 flowchart for the CPU 11 of the image processing apparatus 10, an explanation is made concerning image processing. At a step S11, CPU 11 is initialized based on an initial value stored in the program data area 202 in FIG. 4. At a step S11, the CPU 11 set for example to the initial value of the moving speed of the object in the program data region 142 (FIG. 4) of the RAM 14. Then, at a step S12, CPU 11 outputs a control pad data request command stored in the program data area 202 to the RCP (the bus control circuit 12). Accordingly, at the step S12, the CPU 11 receives commands as shown in FIG. 10 at that time to store them to command accommodating storage sites 174a–174d for respective channels. At this time, the count values of the X counter 444X and the y counter 444Y are provided to the CPU 11 as XY coordinate data.

Then at a step S12a the CPU 11 execute processes to alter the position of the object in accordance with joystick data from the controller 40 which has been stored in the command accommodating sites 174a–174d for the channels (FIG. 6). Note that the step S12a is explained in detail below with reference to FIG. 14.

At a step S13, the CPU 11 carries out predetermined desired image processing based on the program stored in the program data area 202 and the image data 201. While the CPU 11 is executing the step S13, the RCP (bus control circuit 12) is executing steps S21–S24 shown in FIG. 12. Then, at a step S14, the CPU 11 outputs image data based on the control pad data stored in the control pad data area 141 in FIG. 4. After completing step S14, the CPU 11 repeats to execute steps S12–S14.

Figure 12:
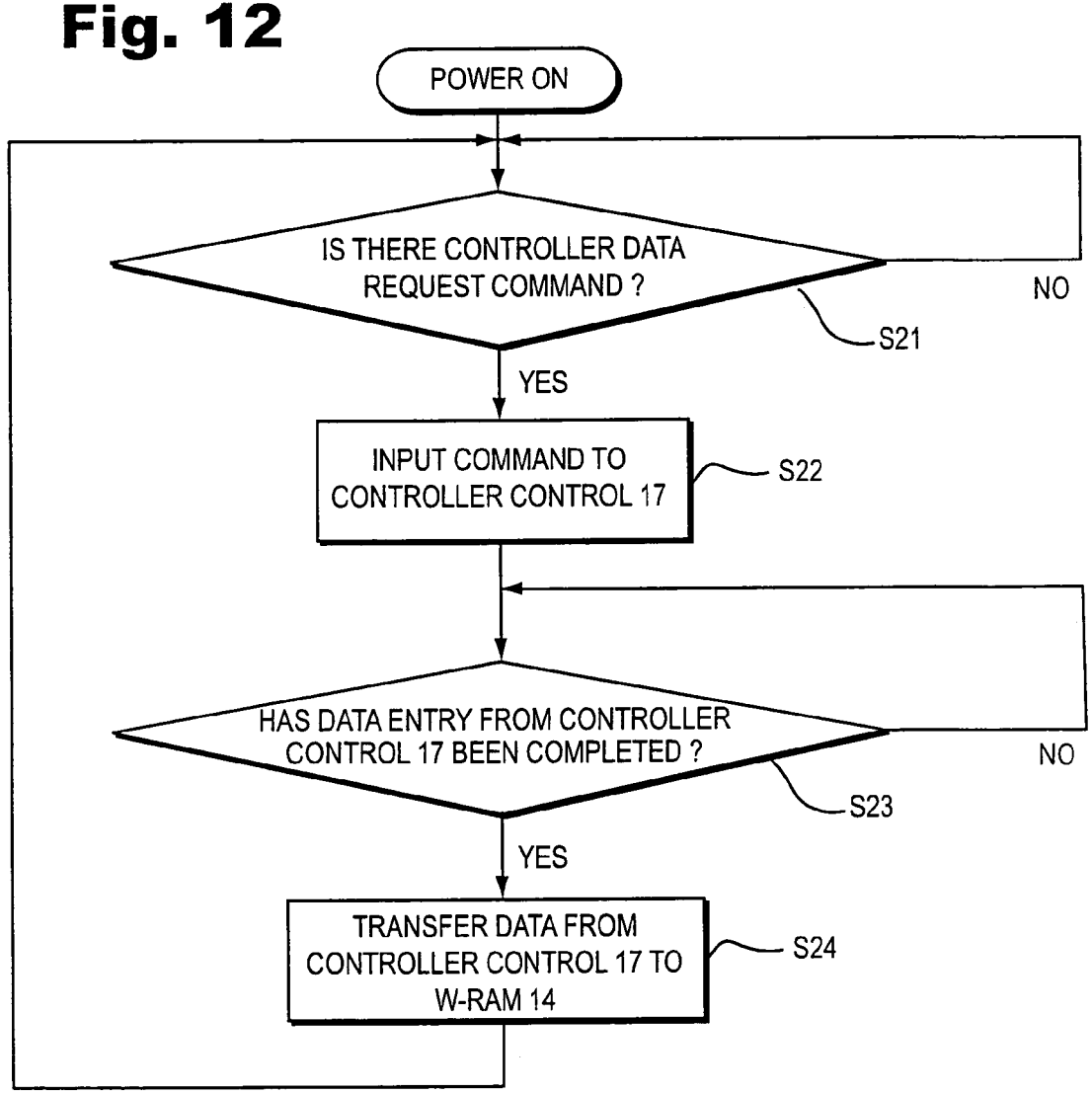
FIG. 12 is a flowchart showing the operation of the bus control circuit in the FIG. 2 embodiment, i.e., an RCP (Reality Co-Processor) in FIG. 3.

The operation of the RCP (the bus control circuit 12) is explained in conjunction with FIG. 12. At a step S21, the bus control circuit 12 determines whether or not the CPU 11 has output a controller data request command (a request command for data on switches of the controller 40 or data relating to the expansion device 50). If a controller data request command has not been output, the RCP waits until one is output. If a controller data request command has been output, the process proceeds to a step S22. At step S22, the bus control circuit 12 outputs a command for reading in controller 40 data to the controller control circuit 17. Then, at a step S23, the bus control circuit 12 determines whether or not the controller control circuit 17 has received data from the controller 40 to store it in the RAM 174. If the controller control circuit 17 has not received data from the controller 40 to store in the RAM 174, the bus control circuit 12 waits at step S23. The controller control circuit 17 has received data from the controller 40 to store it in the RAM 174, the process proceeds to a step S24. At the step S24, the bus control circuit 12 transfers the data of the controller 40 stored in the RAM 174 to the RAM 14. The bus control circuit 12, when completing the data transfer to the RAM 14, returns the process back to the step S21 to repeat execution of the steps S21–the step S24.

The FIG. 11 and FIG. 12 flowcharts show the example wherein, after the bus control circuit 12 has transferred data from the RAM 174 to the RAM 14, the CPU 11 processes the data stored in the RAM 14. However, the CPU 11 may directly process the data in the RAM 174 through the bus control circuit 12.

Figure 13:
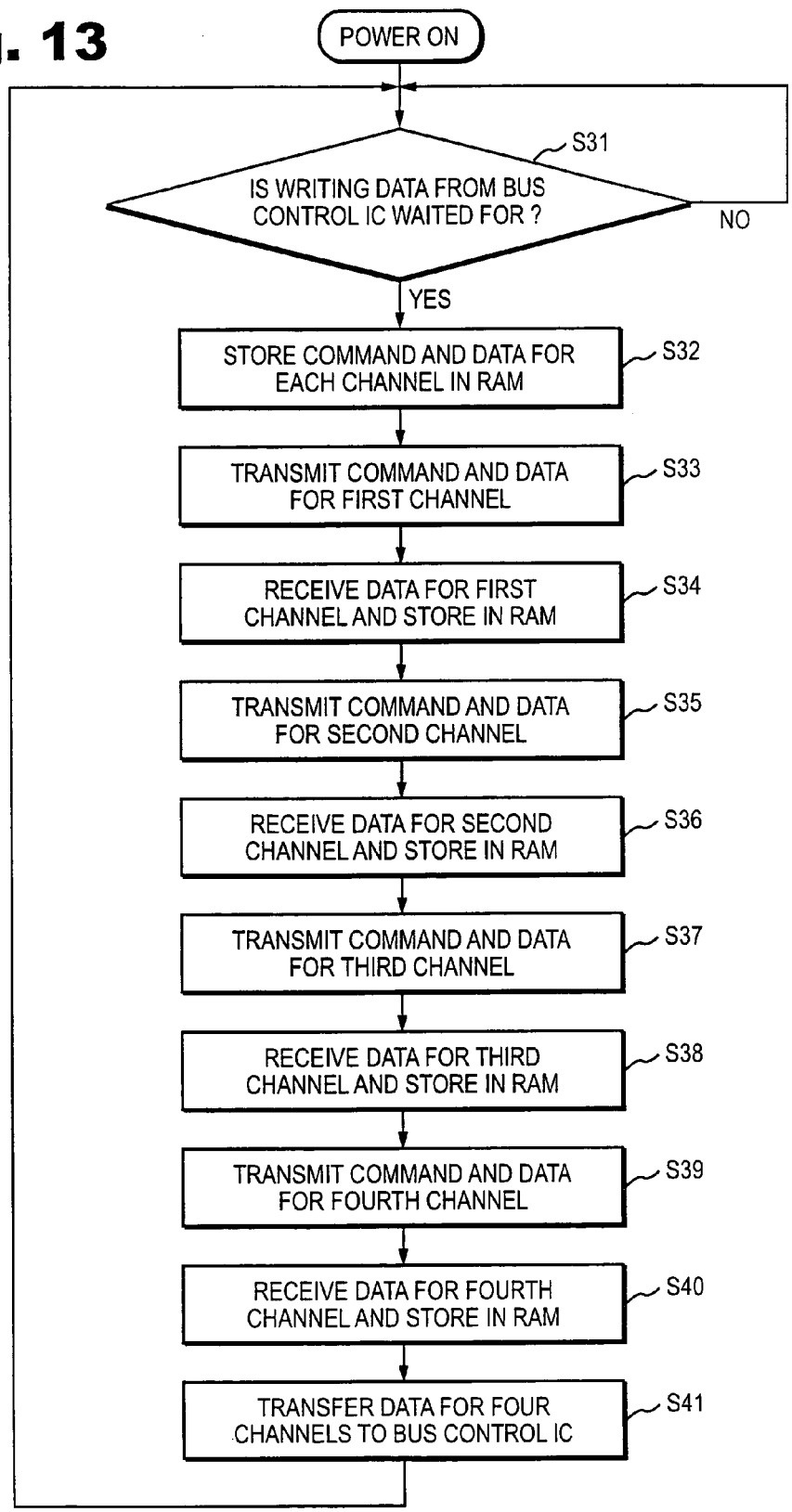
FIG. 13 is a flowchart showing the operation of the controller control circuit in the FIG. 2 embodiment.

FIG. 13 is a flowchart for explaining the operation of the controller control circuit 17. At a step S31, it is determined whether there is a write wait from the bus control circuit 12. If there is not a write wait, the data transfer control circuit 171 waits until there is a write wait from the bus control circuit 12. If there is a write wait, at a next step S32 the data transfer control circuit 171 causes the RAM 174 to store commands for the first to the fourth channels and/or data (hereinafter abbreviated as "command/data"). At a step S33, the command/data for the first channel is transmitted to the controller 40 connected to the connector 181. The control circuit 442 performs a predetermined operation based on the command/data to output data to be transmitted to the image processing apparatus 10. The content of the data is described below in explaining the operation of the control circuit 442. At a step S34, the data transfer control circuit 171 receives data output from the control circuit 442, to cause the RAM to store the data.

At a step S35, the command/data for the second channel is transmitted to the controller 40, in a manner similar to the operation for the first channel at the steps S33. The control circuit 442 performs a predetermined operation based on this command/data to output the data to be transmitted to the image processing apparatus 10. At a step S36 data transfer and write-in processes are carried out for the second channel. Meanwhile, at a step S37, the command/data for the third channel is transmitted to the controller 40. The control circuit 442 performs a predetermined operation based on this command/data to output the data to be transmitted to the image processing apparatus 10. At a step S38 data transfer and write-in processes are carried out for the third channel. Furthermore, at a step S39, the command/data for the fourth channel is transmitted to the controller 40. The control circuit 442 of the controller 40 performs a predetermined operation based on this command/data to output the data to be transmitted to the image processing apparatus 10. At a step S40 data transfer and write-in processes are carried out for the fourth channel. At as subsequent step S41, the data transfer circuit 171 transfer in batch the data which it received at the steps S34, S36, S38 and S40 to the bus control circuit 12.

In the above-identified manner, the data for the first channel to the fourth channel, that is, the commands for the controllers 40 connected to the connectors 181–184 and the operating state data to be read out of the controllers 40, are transferred by time-divisional processing between the data transfer control circuit 171 and the control circuit 442 respectively within the controllers 40.

Figure 14:
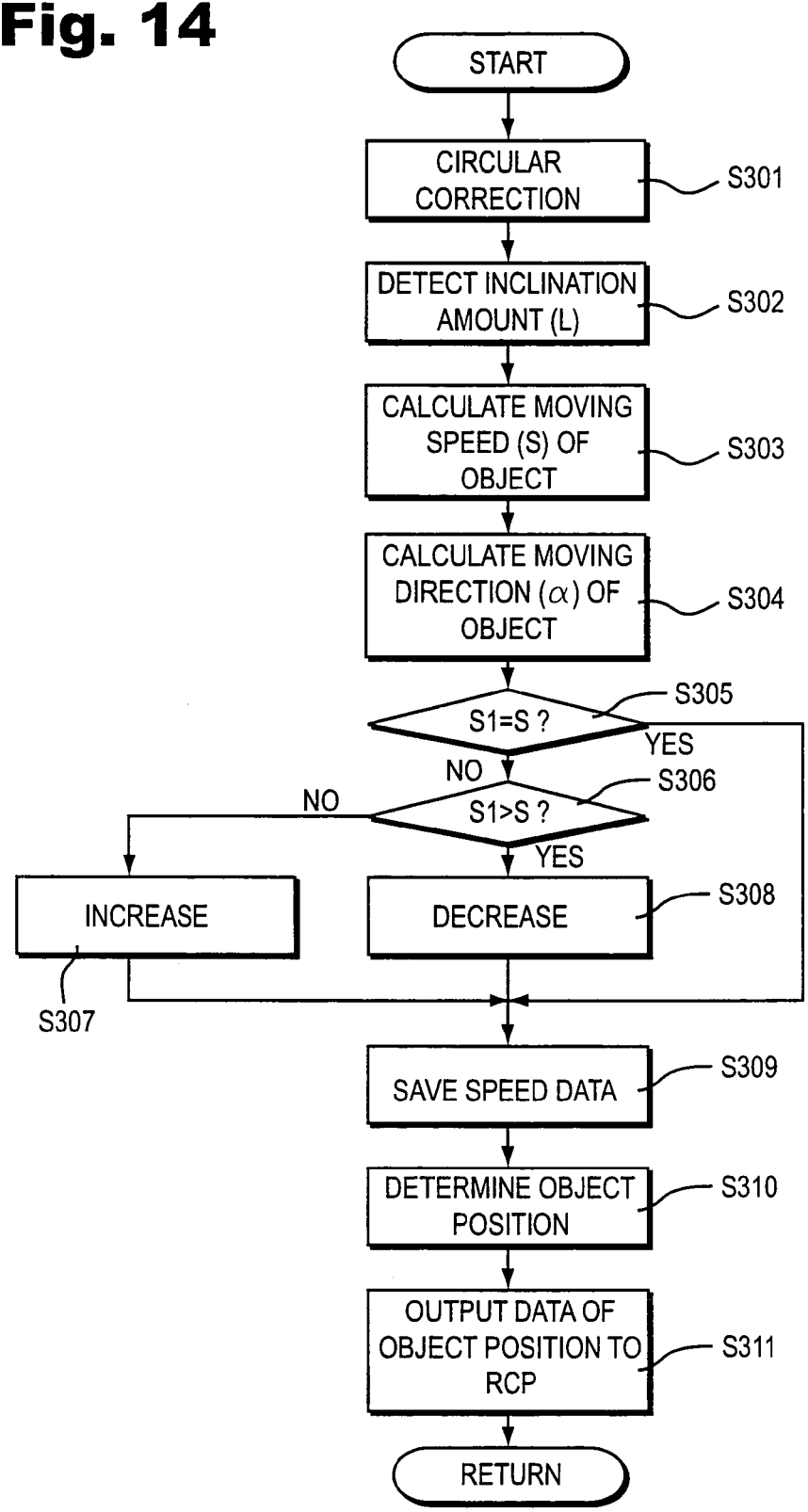
FIG. 14 is a flowchart showing a subroutine for varying the position of the object in the FIG. 2 embodiment.
Figure 15:
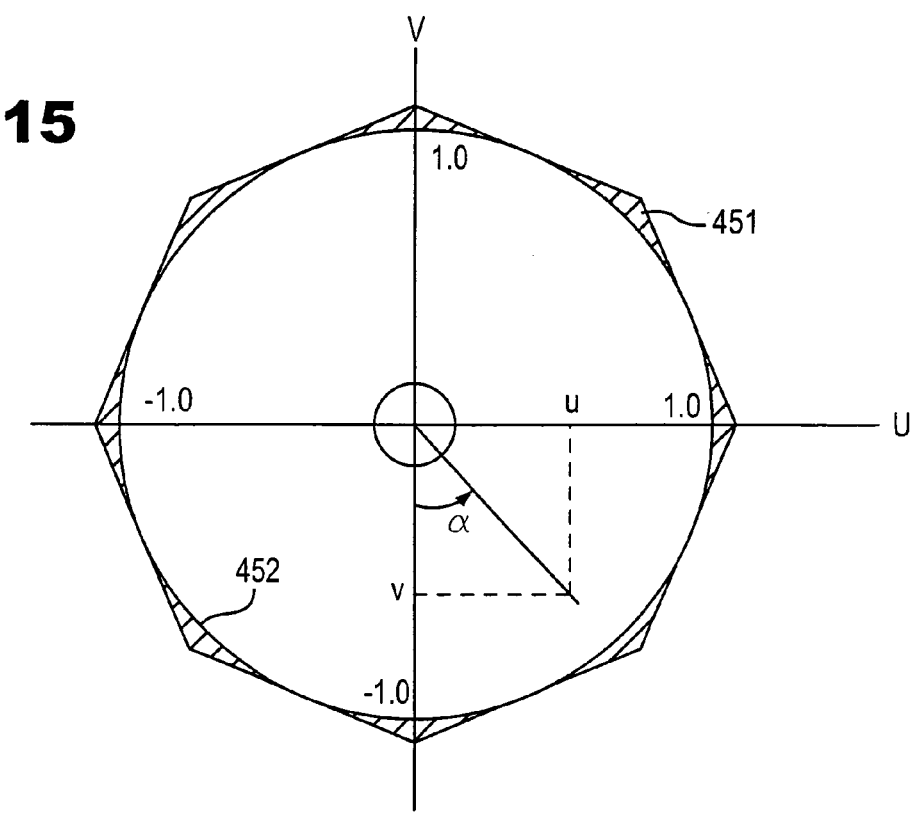
FIG. 15 is an illustrative view showing the relation between the inclinable range of the analog joystick and the circular correction therefore.
Figure 16:
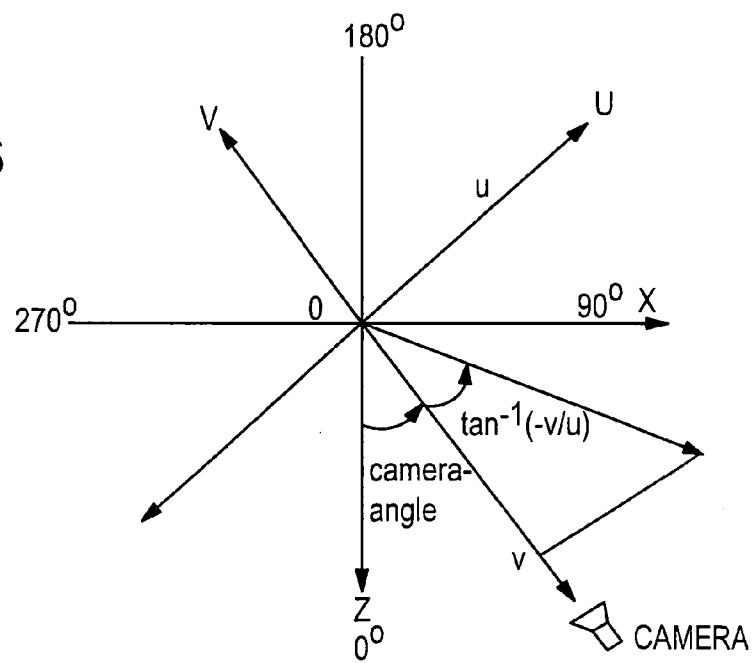
FIG. 16 is an illustrative view showing the moving direction of the object.

With reference to FIG. 14, object position modifying step S12a in FIG. 11 is explained in detail. At a first step S301 in FIG. 14, the CPU 11 corrects the joystick data, i.e., the X coordinate data and the Y coordinate data, from the controller 40. The joystick 45 (FIG. 7) has a structure that can be inclined within an octagonal range 451 in a plane as shown in FIG. 15. Accordingly at the step S301, the data within the octagonal range of inclination is converted or corrected into data within a circular range 452. There is no necessity of executing the correcting step. That is, the subsequent steps may be executed with the octagonal inclination range data.

At the step S301, the XY coordinate data for the joystick 45 is converted into coordinate data (u, v) in an UV plane as shown in FIG. 15. On this occasion, the maximum amount of inclination of the joystick 45 is normalized to "1". That is, the joystick 45 in the UV plane in FIG. 15 is allowed to incline within respective ranges of $-1.0 \leq u \leq 1.0$ and $-1.0 \leq v \leq 1.0$. This is because, since a square curve is utilized to calculate the moving speed S of the object as stated later, a low speed range thereof is to be extended. In this manner, it becomes possible to move the object at a considerably slow speed.

At subsequent steps S302, S303 and S304, the CPU 11 calculates or detects the amount of inclination L of the joystick 45, the moving speed S of the object and the moving direction ✕ thereof according to following Equations (1), (2) and (3), based on the corrected joystick data (u, v), $$L = \text{the square root of } ``u^2 + v^2\text{''} \quad (1)$$

$$S = L^2 \times \text{max-speed} \quad (2)$$

$$\text{✕} = \tan^{-1}(u/-v) + \text{camera-angle} \quad (3)$$

where, L: the inclination amount of the joystick, u, v: is the inclination amount in each axis (coordinate positions), S: is the moving speed of the object, where the max-speed: self-running maximum speed (e.g., 32 cm/frame), ✕ the direction of object movement. Equation (3) means that in a three-dimensional space the direction ✕ of object movement is determined by the relative relations between the direction of joystick 45 inclination and the point of view or angle of a camera (camera-angle) at which the object is "photographed" in three-dimensional space.

After calculating respectively at the steps S302, S303 and S304 the inclination amount L of the joystick, the moving speed S of the object and the moving direction ✕ thereof in accordance with Equations (1), (2) and (3), the CPU 11 at a step S305 compares the actual moving speed S1 of the object in the previous frame stored at the speed data region 142 of the RAM 14 with the speed S calculated at the step S303, determining whether they are equal to or not. If they are not coincident (S1 is not=to S), the CPU 11 determines whether S1>S at a next step S306.

If the determination is "No" at step S306, the process of acceleration is executed at a step S307, while if "Yes" is determined, the process of deceleration is executed at a step S308. In the acceleration process at the step S307, a predetermined acceleration A is added to the actual moving speed S1 in the previous frame according to Equation (4). Note that the acceleration A is provided as one example by following Equation (5):

$$S=S1+A \quad (4)$$

$$A=1.1-S1/43.0 \quad (5)$$

Also, in the deceleration process at the step S308, a predetermined deceleration B is subtracted from the actual moving speed S1 in the previous frame according to Equation (6). Note that the deceleration B is provided as one example by following Equation (7):

$$S=S1-B \quad (6)$$

$$B=2.0 \quad (7)$$

The reason for determining in Equation (5) the acceleration A based on the speed S1 in the previous frame is to avoid abrupt changes of speed. Although in Equation (7) the deceleration B was set as a constant, it may alternatively be set as a function of moving speed S1 in the previous frame in a manner similar to the acceleration A. Furthermore, the acceleration A may be a constant value.

If "Yes" is determined at step S305, the process proceeds to a step S309 as is the case when executing steps S307 or S308. At step S309, either of the moving speed S determined at the step S307 or the moving speed determined at step S308 is written in the speed data region 142 of the RAM 14, thereby updating the speed data.

At a next step S310, the position x and z of the object is calculated according to following Equations (8) and (9), based on the moving speed thus determined. That is, the position of the object is determined by the vector amount S and the vector angle $\propto$.

$$X=x+S\times\sin\propto \quad (8)$$

$$z=z+S\times\cos\propto \quad (9)$$

At a step S311, the CPU 11 outputs the position data determined by Equations (8) and (9) to the bus control circuit, or the RCP, 12. In response, the RCP 12 executes signal processing and image processing in dependence upon the object position data given thereto, and outputs image data through the I/O control 12 to the D/A converter 16.

In this manner, the moving direction and the moving amount (moving speed) of the object are determined in the above example based on the inclination amount data for the controller 40 joystick, thereby varying the position of the object in the three-dimensional space. In other words, the object is displayed at a position thus varied in the next frame on the display 32 (monitor 30).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling the direction of an object in a processor-managed three-dimensional space via an operating member manipulated by a user, comprising the steps of:
    detecting a manipulation of the operating member;
    determining, at the time of the manipulation, a moving direction the processor should move the object based on a direction in which the user moves the control member, offset by a camera angle at which the object is being viewed by the user; and,
    moving the object in the three-dimensional space in the above-determined moving direction.

2. A method as in claim 1, wherein said operating member is a joystick.

3. A method as in claim 1, wherein said three-dimensional space is a video game space.

4. In a three-dimensional image processing system, including an image processing apparatus connected to a display to generate image data for displaying an object existing in a three-dimensional space on said display according to a program, and an operating member manipulated by a user, a method of controlling the moving of an object, said method comprising the steps of:
    detecting an inclination direction from said operating member upon manipulation by the user;
    determining a moving direction of the object in the three-dimensional space based on the inclination direction and a camera angle at which the object is being viewed by the user at a time when the inclination direction is detected; and
    moving the object in the determined moving direction on said display.

5. A method as in claim 4, wherein said operating member is a joystick.

6. A method as in claim 4, wherein said three-dimensional space is a video game space.

7. A three-dimensional image processing system, including an image processing apparatus connected to a display to generate image data for displaying an object existing in a three-dimensional space on said display according to a program, and an operating member manipulated by a user that controls the moving of an object, wherein:
    detecting means detect inclination direction data from said operating member upon manipulation by the user;
    determining means for determining a moving direction of the object in the three-dimensional space based on the inclination direction and a camera angle at which the object is being viewed by said user at a time when the inclination direction is detected; and
    moving means for moving the object in the determined moving direction on said display.

8. The three-dimensional image processing system of claim 7, wherein said operating member is a joystick.

9. The three-dimensional image processing system of claim 7, wherein said three-dimensional space is a video game space.

* * * * *